Patented Sept. 17, 1940

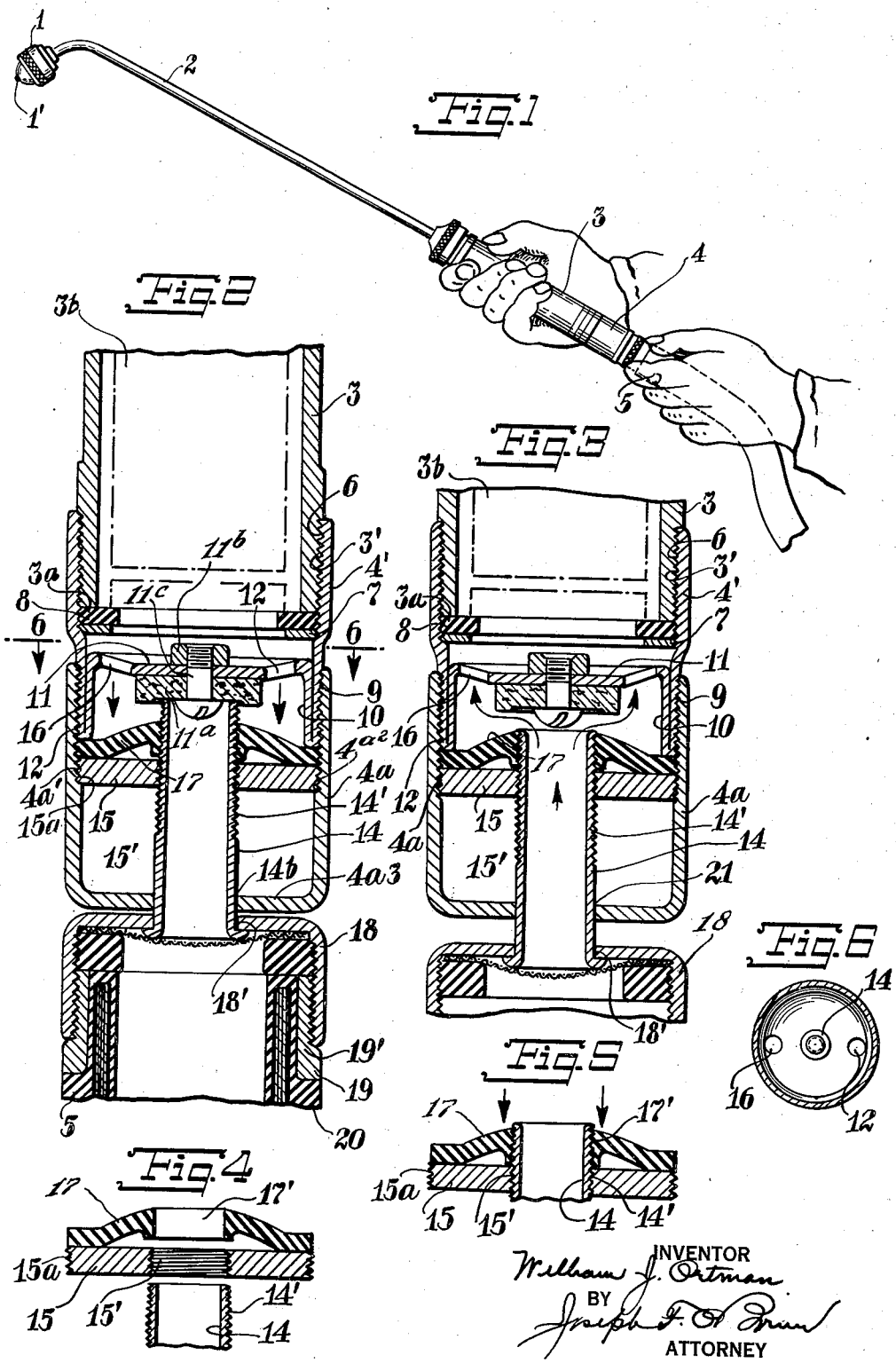

2,215,375

UNITED STATES PATENT OFFICE 2,215,375

VALVE MECHANISM FOR SPRAY DEVICES

William J. Ortman, Woodhaven, N. Y., assignor of one-fourth to Charles H. Hussey, New York, N. Y., and one-fourth to Joseph F. O'Brien, Englewood, N. J.

Application January 21, 1939, Serial No. 252,081

4 Claims. (Cl. 251—8)

This invention relates to improvements in valve mechanism for spraying devices and the like, and more particularly relates to spraying devices which are connected to hoses to spray insecticides, fungicides and like chemical preparations with water on plants of all types, such as shrubs, trees, flowers, vegetables etc.

In devices of the character under consideration, a mechanism conventionally embodying a nozzle with fine spray-outlet apertures, a cartridge holder and a shut-off valve have heretofore been employed. This mechanism has been conventionally connected to a water hose, and as a result of the type of spray-outlet apertures employed, as well as the use of a cartridge in the holder, considerable back pressure is created within the device and great difficulty has been encountered in attempting to provide a non-leaking valve for the device which would not be too bulky or unwieldy to handle in connection with the hose. Some of these devices have heretofore been employed having an unwieldy conventional shut-off valve provided with a handle extending outside the hose line, and a valve which is contained within the normal outlines of the hose has also heretofore been proposed. This last-mentioned valve embodies a solid cylindrical rubber plug arranged in fixed position in a cylindrical metallic shell and having a longitudinal eccentric bore or valve passage which has a side connection within the rubber plug with an axial bore within which an apertured spherical head frictionally revolves. This device has been unsatisfactory because of the difficulty of turning the metallic head in the rubber plug, the sticking and jamming of the parts and the fact that it is difficult to determine when completely open and closed positions are reached or when the best registration between the passage opening in the metallic head and the passage opening in the rubber plug is reached and the opening and closing movements are also so short that it is difficult to vary the stream passing therethrough. Also, this type of device is not universal for all water pressures encountered but it is necessary to provide a special device for the particular water pressure of the locality in which it is to be employed.

One of the objects of my invention is to overcome the difficulties hereinabove specified and to provide a spraying mechanism which will be universal as to all pressures encountered in use; which will be easy and simple to operate, and which will be entirely non-leaking.

Another object of my invention is to utilize the back pressure due to the small holes in the nozzle and to the use of cartridges in order to tighten up the connection between the movable parts of the valve and to prevent leakage through such connection or joint.

Another object of my invention is, in a device of the character specified, to provide a valve member which is movable to opened and closed position by screw pressure against a washer, and comprises a hollow axially-disposed screw-threaded tube for liquid passage into the valve chamber.

Another object of my invention is to provide a valve chamber with sealed joints or connections one of which comprises a novel connection between a diaphragm and said movable axially-disposed screw-threaded tube, the parts being so arranged that back pressure will act upon the diaphragm to force it into a tighter joint with said movable axial tubular member, whereby an absolutely leak-proof connection is obtained.

Another object of my invention is to utilize, in a single valve chamber a centrally-disposed sealed connection between an axially-disposed tubular member and a flexible diaphragm and also to provide, in combination with this connection, a circumferential connection between a circumferential shell on one member and a partition in another member also pressing against the said diaphragm whereby a single rubber diaphragm may be utilized to seal screw-threaded connections between stationary shell members at the outer perimeter and also to seal a screw-threaded connection between a movable tubular axial member and a partition within the shell.

With these and other objects in view, the invention comprises the combination of members and arrangement of parts so combined as to co-act and co-operate with each other in the performance of the functions and the accomplishment of the results herein contemplated, and comprises in one of its adaptations the species or preferred form illustrated in the accompanying drawing, in which:

Fig. 1 is a view in side elevation of a spray device embodying my invention;

Fig. 2 is a longitudinal section of a portion of the cartridge holder, valve and hose elements embodied in the device shown in Fig. 1, the valve being shown in closed position;

Fig. 3 is a similar sectional view showing the valve in open position;

Fig. 4 is a diagrammatic section showing the diaphragm, screw-threaded partition and screw- Fig. 5 is a diagrammatical section showing the parts illustrated in Fig. 4 when the connection has been made; and Fig. 6 is a section on the line 6—6 of Fig. 1, looking in the direction of the arrows.

Referring now to the drawing which illustrates a preferred embodiment of my invention, 1 indicates a spray nozzle of the type usually employed in gardens for shrubs, trees, flowers, vegetables etc., and is provided with the conventional small nozzle openings 1'. The nozzle 1 is connected through a tube 2 with a cartridge holder 3 which is connected, by valve 4, to a hose 5, the opposite end of which is connected to any suitable water supply not shown.

In the embodiment of my invention illustrated, the valve 4 is composed of two casing or shell parts 4', 4ª; the part 4' is provided, as shown, with an internal screw-thread 6 which is connected to an external screw-thread 3' on the lower end of the cartridge holder 3, this connection being stationary and made in the conventional manner by providing the part 4' with a ring partition 7 and inserting between said ring partition and the bottom edge 3ª of the holder member 3, a ring-shaped flexible washer 8 so as to provide a conventional sealed joint at this place. The bottom portion of the member 4' is preferably provided with an external screw-thread 9 and has a reentrant lining portion or thimble 10 extending to and including a transversely-disposed partition 11 which comprises a valve seat provided with suitable liquid passage openings 12.

As illustrated, the valve seat is provided within the reentrant portion with a washer 11ª, fastened thereto by nut 11ᵇ and bolt 11ᶜ and this washer, which is centrally-disposed between the apertures 12 forms a packing member between the valve seat and a centrally-disposed movable tubular valve member 14 which is provided with an external screw-thread 14' threaded within and cooperating with an internal screw-thread 15' of a partition 15 which is, at its outer edge, provided with a screw-thread 15ª engaging with a screw-thread 4ª' on the part 4ª, so that the partition 15' seats against a shoulder 4ª² in the part 4ª which provides a definite stop therefor. I preferably seal the two joints between the thimble portion 10 of the valve casing member 4' and the nipple portion 16 of the valve casing member 4ª as well as the central joint between the valve member 14 and the partition 15 by a single diaphragm member 17. The diaphragm 17 is circular in configuration and the peripheral end of said diaphragm is extended between the bottom edge of the member 4' and the external perimeter of the partition-washer 15 while a central bore 17' is provided for the passage through the diaphragm of the movable axial valve member 14 which, after being threaded through the screw-thread 15' of the partition 15, is then threaded through the circular axial opening 17'. In such threading movement, the screw-threads 14' of the member 14 form threads in the bore 17', and in such threading provide a screw-threaded joint which will in itself be tight principally because of the fact that the screw-thread, in its passage through the opening 17', will effectually fix the connected parts in stationary or fixed relationship with each other, and the only movement in opening or closing the valve will be a turning movement without any longitudinal or axial displacement of the diaphragm. A joint is thus formed that in itself will be comparatively tight. This joint, however, in accordance with applicant's invention, is formed in a rubber diaphragm at a raised central portion thereof, and when, in a device of the character specified, back pressure in the liquid is produced in view of the small apertures in the nozzle and because of the resistance to normal flow encountered in its passage around a cartridge in the cartridge holder, this back pressure will act upon the raised portion of the diaphragm and force the screw-threaded bore thereof more tightly against the screw-threads of the member 14 so that there is produced between the diaphragm or washer 17 and the screw-threaded portion of the member 14, a completely sealed joint which will prevent any liquid from passing therethrough to the metal-to-metal joint at 15' between the screw-threaded portion 14' and the screw-thread bore 15' of the partition 15.

The member 14 at its lower end is connected at 18' to a hose coupling member 18 which is provided with an internal thread 18ª connected to an external thread 19' of a hose coupling 19 suitably fastened to a hose 20. In the preferred embodiment of my invention the casing member 4ª is elongated below the partition 15 and turns in at 4ª³ to provide an aligning connection at 14ᵇ with the axially-disposed valve member 14. Obviously, upon a turning movement of the hose coupling 18 relatively to the valve casing member 4ª, the axial valve member 14 will, by reason of the screw-threaded connection with the partition 15, be moved into and out of connection with the washer 11ª on the valve seat 11 and a turn in one direction will close the valve and prevent water from flowing through the outlet apertures 12, while a turning movement in the opposite direction will lower the member 14 and permit water, from the hose 20, to flow therethrough. After the water, however, reaches the cartridge 3ᵇ, and the small openings 1' of the nozzle 1, a back pressure will be produced which will act upon the raised portion 17' of the diaphragm to tighten the joint between the same and the member 14 so as to produce a highly efficient tight joint at this movable connection between the said washer and member 14.

Having described my invention, I claim:

1. Valve mechanism for a spray device having a pressure-resisting nozzle and adapted to be connected to a water hose, comprising a metallic cylindrical valve casing disposed coaxially with and having a diameter substantially similar to the hose, said casing enclosing a valve chamber having a valve seat and also provided with a metallic stationary cross partition having a central screw-threaded opening, a diaphragm within the valve chamber disposed above said partition and provided with a central bore aligned with the said screw-threaded bore therein, and a metallic centrally-disposed tubular valve-member provided with a screw-thread coacting with said central screw-threaded opening and movable through the aligned bore of the diaphragm into contact with the valve seat to alternately cut off and free passage of liquid through said chamber, said diaphragm being flexible and having a connection between said central bore and said valve member so arranged that back pressure in the valve chamber will more tightly seal the joint between said diaphragm and said movable valve-member, and a manually-operable axially-disposed operating member for turning said centrally-disposed tubular valve-member.

2. Valve mechanism for a spray device having a pressure-resisting nozzle and adapted to be connected to a water hose, comprising a metallic cylindrical valve casing disposed coaxially with and having a diameter substantially similar to the hose, said casing enclosing a valve chamber having a valve seat and also provided with a metallic stationary cross partition having a central screw-threaded opening, a diaphragm within the valve chamber disposed above said partition and provided with a central bore aligned with the said screw-threaded bore therein, and a metallic centrally-disposed tubular valve-member provided with a screw-thread coacting with said central screw-threaded opening and movable through the aligned bore of the diaphragm into contact with the valve seat to alternately cut off and free passage of liquid through said chamber, said diaphragm being flexible and having a raised central portion provided with a screw-threaded connection with said centrally-disposed movable valve-member.

3. Valve mechanism for a spray device having a pressure-resisting nozzle and adapted to be connected to a water hose, comprising a two-member metallic cylindrical valve casing disposed coaxially with and having a diameter substantially similar to the hose, said casing enclosing a valve chamber having a valve seat and also provided with a metallic stationary cross partition having a central screw-threaded opening, a diaphragm within the valve chamber disposed above said partition and provided with a central bore aligned with the said screw-threaded bore therein, and a metallic centrally-disposed tubular valve-member provided with a screw-thread coacting with said central screw-threaded opening and movable through the aligned bore of the diaphragm into contact with the valve seat to alternately cut off and free passage of liquid through said chamber, said diaphragm being flexible and having a raised central portion provided with a screw-threaded connection with said centrally-disposed movable valve-member, and one of said valve casing members being formed of a single piece of sheet metal bent to provide a cylindrical valve casing portion and a reentrant portion having a valve seat.

4. Valve mechanism for a spray device having a pressure-resisting nozzle and adapted to be connected to a water hose, comprising a two-member metallic cylindrical valve casing disposed coaxially with and having a diameter substantially similar to the hose, said casing enclosing a valve chamber having a valve seat and also provided with a metallic stationary cross partition having a central screw-threaded opening, a diaphragm within the valve chamber disposed above said partition and provided with a central bore aligned with the said screw-threaded bore therein, and a metallic centrally-disposed tubular valve-member provided with a screw-thread coacting with said central screw-threaded opening and movable through the aligned bore of the diaphragm into contact with the valve seat to alternately cut off and free passage of liquid through said chamber, said diaphragm being flexible and having a raised central portion provided with a screw-threaded connection with said centrally-disposed movable valve-member, said diaphragm also having a stationary circumferential connection at its outer edge with the valve casing members.

WILLIAM J. ORTMAN.